(12) United States Patent
Laverne et al.

(10) Patent No.: US 12,209,697 B2
(45) Date of Patent: Jan. 28, 2025

(54) DEVICE FOR CONNECTION OF TWO DOUBLE-WALL PIPES AND HYDROGEN LINE INCLUDING SAID CONNECTION DEVICE

(71) Applicants: Airbus SAS, Blagnac (FR); Airbus Operations SAS, Toulouse (FR)

(72) Inventors: Julien Laverne, Toulouse (FR); Jonathan Landolt, Blagnac (FR)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 15 days.

(21) Appl. No.: 18/152,312

(22) Filed: Jan. 10, 2023

(65) Prior Publication Data

US 2023/0235842 A1    Jul. 27, 2023

(30) Foreign Application Priority Data

Jan. 25, 2022  (FR) ...................................... 2200603

(51) Int. Cl.
*F16L 39/00*  (2006.01)
*F16L 59/147*  (2006.01)
*F16L 59/18*  (2006.01)

(52) U.S. Cl.
CPC .......... *F16L 39/005* (2013.01); *F16L 59/147* (2013.01); *F16L 59/182* (2013.01)

(58) Field of Classification Search
CPC ..... F16L 39/005; F16L 59/147; F16L 59/182; F16L 59/065; F16L 59/18
See application file for complete search history.

(56) References Cited

U.S. PATENT DOCUMENTS 1,140,633 A * 5/1915 Trucano ................ F16L 59/065
                                                    285/294.1
1,466,592 A * 8/1923 King ........................ E03B 7/12
                                                    285/179

(Continued)

FOREIGN PATENT DOCUMENTS

FR         527140 A  * 10/1921
FR        1372296 A  *  9/1964

(Continued)

OTHER PUBLICATIONS

Codling R.,Insulated Pipework System for Transporting Crude Oil and Gas, Contains Setting Polymeric Composition in Evacuated Volumes in Space Defined by Annular Plugs in Between Outer Sleeve and Inner Flow Pipe,Jul. 12, 2001,WO-0150055 A1.*

(Continued)

*Primary Examiner* — Zachary T Dragicevich
*Assistant Examiner* — James A Linford
(74) *Attorney, Agent, or Firm* — Greer, Burns & Crain, Ltd.

(57) ABSTRACT

A device for connection of double-wall pipes including an interior connection system connecting the first and second interior pipes and an exterior connection system including a first part that cooperates with an end section of the first exterior pipe and a second part that cooperates with an end section of the second exterior pipe. The exterior connection system is configured so that at a first temperature at least one of the first and second parts exerts a contact force on the end section of the corresponding first or second exterior pipe greater than at a second temperature higher than the first temperature.

11 Claims, 6 Drawing Sheets

(56) References Cited

U.S. PATENT DOCUMENTS

| | | | | |
|---|---|---|---|---|
| 1,497,652 A | * | 6/1924 | Browne | ................. F16L 53/32 |
| | | | | 285/123.1 |
| 1,909,075 A | * | 5/1933 | Ricker | ................... E21B 17/18 |
| | | | | 175/215 |
| 2,937,662 A | * | 5/1960 | Green | .................... F16L 59/22 |
| | | | | 285/133.11 |
| 4,084,842 A | * | 4/1978 | Stonitsch | ............... F16L 59/18 |
| | | | | 285/123.17 |
| 6,116,290 A | * | 9/2000 | Ohrn | .................... F16L 59/143 |
| | | | | 138/148 |
| 2009/0159146 A1 | * | 6/2009 | Jackson | ............... F16L 58/181 |
| | | | | 138/146 |
| 2019/0162357 A1 | | 5/2019 | Yagi et al. | |

FOREIGN PATENT DOCUMENTS

| | | | | |
|---|---|---|---|---|
| FR | 2849151 A1 | * | 6/2004 | ............. F16L 25/12 |
| GB | 2166514 A | | 5/1986 | |
| WO | WO-8603819 A1 | * | 7/1986 | |
| WO | 2012048535 A1 | | 4/2012 | |

OTHER PUBLICATIONS

French Search Report dated Aug. 18, 2022; priority document.

* cited by examiner

DEVICE FOR CONNECTION OF TWO DOUBLE-WALL PIPES AND HYDROGEN LINE INCLUDING SAID CONNECTION DEVICE

CROSS-REFERENCES TO RELATED APPLICATIONS

This application claims the benefit of the French patent application No. 2200603 filed on Jan. 25, 2022, the entire disclosures of which are incorporated herein by way of reference.

FIELD OF THE INVENTION

The present invention relates to a device for connection of two pipes and to a hydrogen line including the connection device.

BACKGROUND OF THE INVENTION

In accordance with one embodiment that can be seen in FIGS. 1 and 2, a device for connection of a hydrogen line includes:
- a first double-wall pipe 10 having a first axis A10, first inner and outer pipes 10.1, 10.2 coaxial with the first axis A10 and a first end ring 10.3 connecting in a sealed manner the first interior and exterior pipes 10.1, 10.2,
- a second double-wall pipe 12 having a second axis A12, second interior and exterior pipes 12.1, 12.2 coaxial with the second axis A12 and a second end ring 12.3 connecting in a sealed manner the second interior and exterior pipes 12.1, 12.2,
- a connection system 14 configured to hold the first and second end rings 10.3, 12.3 pressed one against the other.

In accordance with one configuration the first end ring 10.3 includes an annular first front face F10 perpendicular to the first axis A10 and oriented in use toward the second pipe 12 and a first flange 16 projecting relative to the first exterior pipe 10.2 that has a first lateral face 16.1 coplanar with the first front face F10 and a second lateral face 16.2 opposite the first front face 16.1 and at an angle to the latter that widens in the direction of the first axis A10.

In parallel with this, the second end ring 12.3 includes an annular second front face F12 perpendicular to the second axis A12 and oriented in use toward the first pipe 10 and a second flange 18 projecting relative to the second exterior pipe 12.2 that has a first lateral face 18.1 coplanar with the second front face F12 and a second lateral face 18.2 opposite the first front face 18.1 at an angle to the latter that widens in the direction of the second axis A12.

The connection device includes a sealing system such as a groove provided at the level of the first or second front face F10, F12 and an annular seal housed and compressed in the groove when the first and second front faces F10, F12 are pressed one against the other.

The connection system 14 includes a clamping collar 20 with a U or V section, for example, that has two flanges 20.1, 20.2 configured to be pressed against the second lateral faces 16.2, 18.2 of the first and second flanges 16, 18, tightening the clamping collar 20 tending to increase the force pressing the first and second front faces F10, F12 against one another.

In the case of a so-called bayonet connection device suitable for a hydrogen line the first interior pipe 10.1 includes an extension 22 projecting relative to the first front face F10 that has an end section 22.1. In a complementary way, the second interior pipe 12.1 includes a widened final section 24 connected to the rest of the second interior pipe 12.1 by a shoulder 24.1. In use, the enlarged final section 24 is configured to receive the extension 22 of the first interior pipe 10.1. To strengthen the seal the enlarged final section 24 has an inside diameter equal to or very slightly greater than the outside diameter of the extension 22 and the shoulder 24.1 is separated from the second front face F12 by a distance equal to or very slightly greater than that separating the end section 22.1 and the first front face F10. The greater this distance, the stronger the seal.

In use, a vacuum of the order of 10-7 to 10-111 bar must be maintained between the interior pipes 10.1, 12.1 and the exterior pipes 10.2, 12.2.

Even though a bayonet connection device of this kind offers excellent performance in terms of sealing, it is not the optimum for an aircraft. In fact, the maintenance of a bayonet connection device proves difficult because of the level of vacuum, of the order of 10-7 to 10-11, necessary for it to function correctly. Moreover, installing a bayonet connection device necessitates a large clearance in the direction of the first and second axes A10, A12 to enable insertion of the extension 22 of the first pipe 10 in the enlarged final section 24 of the second pipe 12. Consequently, when designing the routing of the pipe, it is necessary to take account of these clearances, generally reflected in a length and a mass for the hydrogen line greater than in the absence of clearances.

SUMMARY OF THE INVENTION

The present invention aims to remedy some or all of the disadvantages of the prior art.

To this end the invention has for an object a device for connection of first and second double-wall pipes, the first pipe including a first interior pipe that has an end section and an end surface and a first exterior pipe spaced from the first interior pipe that has an end section and an end surface, the second pipe including a second interior pipe that has an end section and an end surface and second exterior pipe spaced from the second interior pipe that has an end section and an end surface, the connection device including an interior connection system configured to connect the first and second interior pipes and an exterior connection system configured to connect the first and second exterior pipes, including a first part that cooperates with the end section of the first exterior pipe and a second part that cooperates with the end section of the second exterior pipe.

According to the invention, the exterior connection system is configured so that at a first temperature, at least one of the first and second parts exerts a contact force on the end section of the corresponding first or second exterior pipe greater than at a second temperature higher than the first temperature.

In the event of hydrogen leaking at the level of the interior connection system the exterior connection system will exert a greater clamping force on the first and second exterior pipes than in the absence of a leak, thereby contributing to strengthening the seal. Thus, it is no longer necessary to provide an extension at the level of the first interior pipe accommodated in an enlarged final section provided at the level of the second interior pipe.

In accordance with another feature, the exterior connection system is made of a first material different from those of the first and second exterior pipes, this first material having a coefficient of expansion greater than those of the first and second exterior pipes.

In accordance with another feature, the end surfaces of the first and second exterior pipes are spaced by a distance allowing access to the interior connection system. Additionally, the exterior connection system includes a sleeve that has a first part positioned around the end section of the first exterior pipe, a second part positioned around the end section of the second exterior pipe and an intermediate part situated between the first and second parts.

In accordance with another feature, the end sections of the first and second exterior pipes each have a male thread and an outside diameter greater than the outside diameters of the first and second exterior pipes apart from in the male threaded end sections. Additionally, the first and second parts of the sleeve each have a female thread matching the male thread of the end section of the corresponding first or second exterior pipe, the intermediate part of the sleeve having an inside diameter greater than the greatest outside diameter of the first or second exterior pipe to allow the sleeve to slide relative to the first or second exterior pipe.

In accordance with another feature, the connection device includes at least one sacrificial material inserted between the exterior connection system and the end section of the corresponding first and/or second exterior pipe.

In accordance with another feature, the male thread of at least one end section of the first and second exterior pipes is made of a sacrificial material.

In accordance with another feature, the end surfaces of the first and second interior pipes are closely spaced. Additionally, the interior connection system includes a sleeve that has a first part positioned around the end section of the first interior pipe and a second part positioned around the end section of the second interior pipe.

In accordance with another feature, the sleeve is made of a first material different from those of the first and second interior pipes, the first material having a coefficient of expansion greater than those of the first and second interior pipes.

In accordance with another feature, the connection device includes an annular space around the interior connection system and around at least a portion of each of the first and second interior pipes situated on either side of the interior connection system and at least one thermal insulation element positioned in the annular space and filling it at least partly.

In accordance with another feature, the insulation element occupies at least 75% of the annular space, the annular space having a remaining volume subjected to a vacuum.

In accordance with another feature, the insulation element includes at least one mattress filled with microballs.

In accordance with a first embodiment, the insulation element includes a mattress of annular shape filled with microballs.

In accordance with another embodiment, the insulation element includes layers of mattress filled with microballs, each mattress having a semi-cylindrical shape, the interstices between the mattresses of a first layer being offset relative to the interstices between the mattresses of a second layer adjacent to the first layer.

The invention also has for an object a hydrogen line including at least one connection device having any one of the above features.

BRIEF DESCRIPTION OF THE DRAWINGS

Other features and advantages will emerge from the following description of the invention given by way of example only with reference to the appended drawings, in which.

DETAILED DESCRIPTION OF THE PREFERRED EMBODIMENTS

Figure 1:
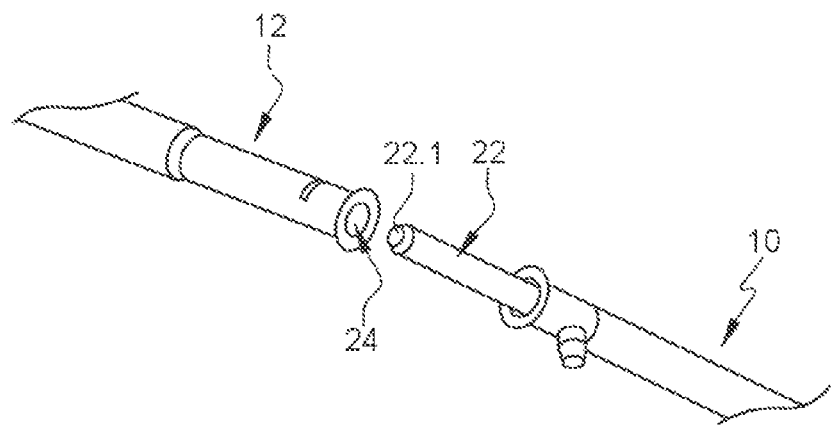
FIG. 1 is a perspective view of a connection device in a disconnected state illustrating one prior art embodiment.
Figure 2:
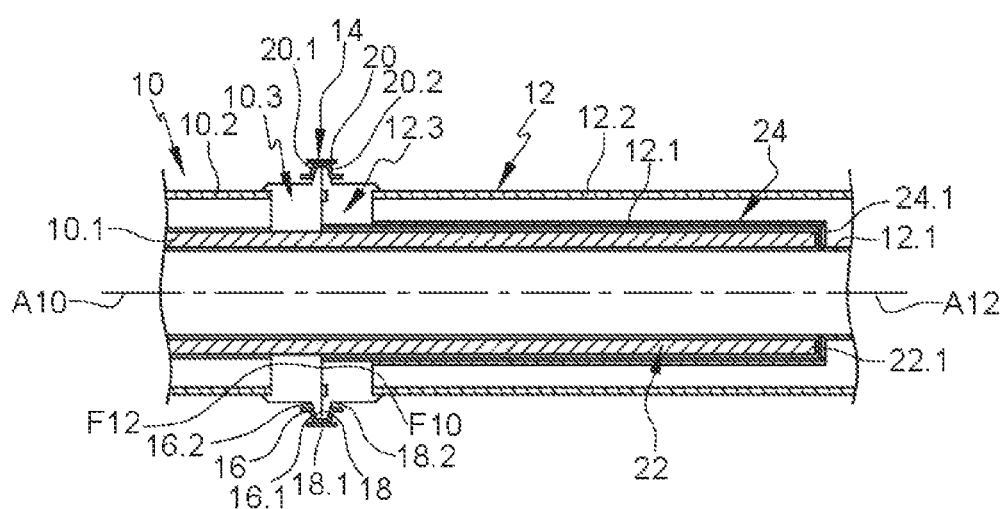
FIG. 2 is a longitudinal section of a connection device in a connected state illustrating one prior art embodiment.
Figure 3:
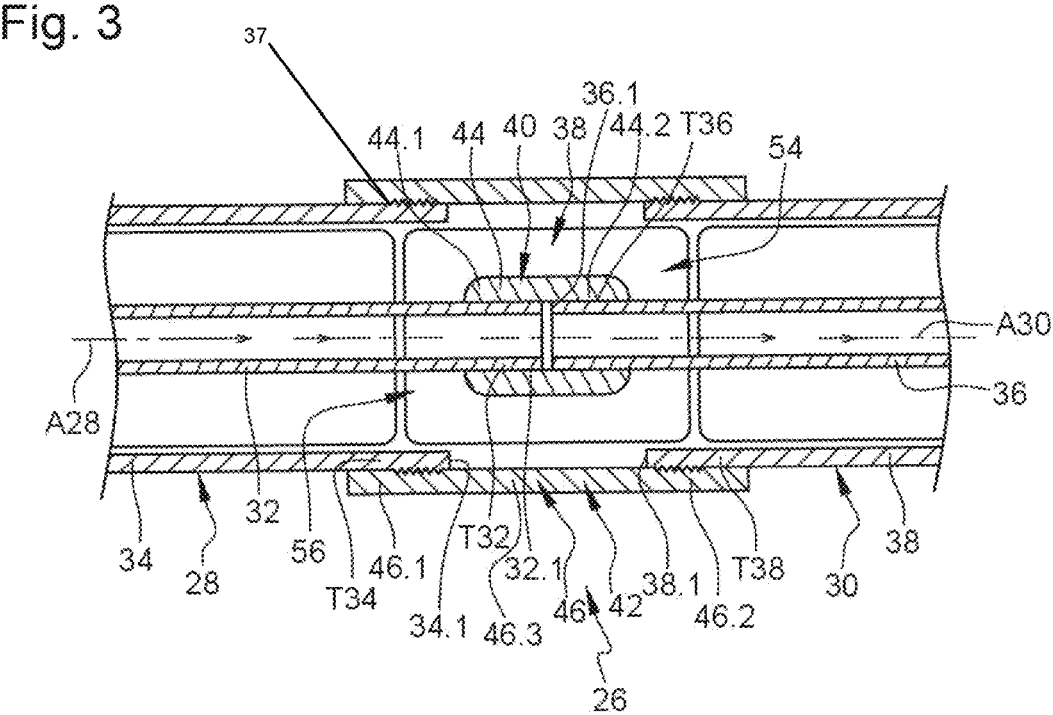
FIG. 3 is a longitudinal section of a connection device in a connected state illustrating a first embodiment of the invention.
Figure 4:
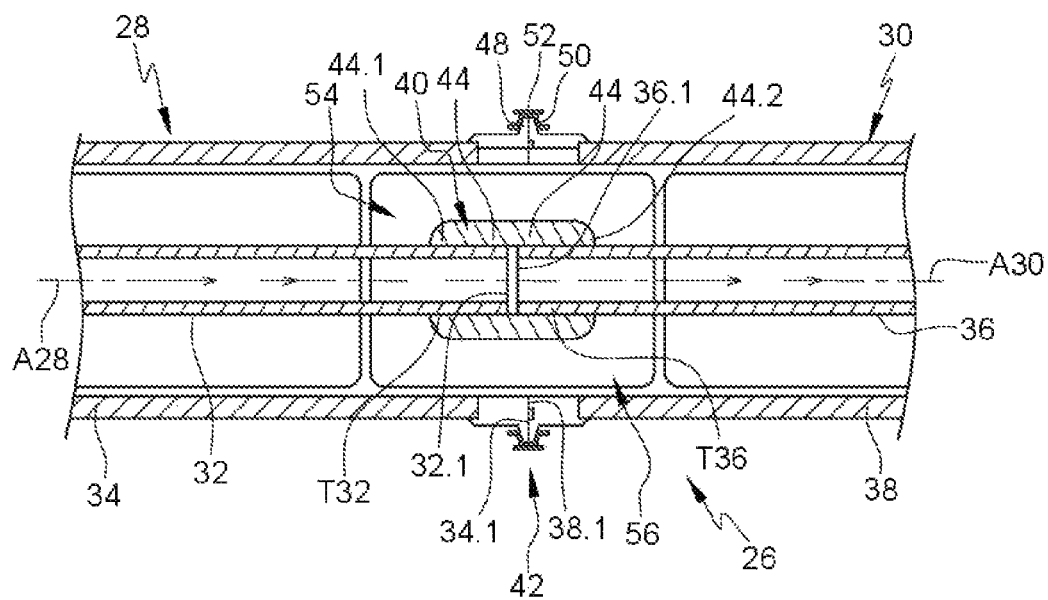
FIG. 4 is a longitudinal section of a connection device in a connected state illustrating a second embodiment of the invention.

In accordance with the embodiments that can be seen in FIGS. 3 and 4, a line includes at least one connection device 26 connecting first and second double-wall pipes 28, 30. In accordance with one application, the line is intended for hydrogen at a cryogenic temperature.

In accordance with one configuration, the first pipe 28 has a first axis A28 and first and second interior and exterior pipes 32, 34 coaxial with the first axis A28. The first interior and exterior pipes 32, 34 need not be coaxial with one another. Regardless of the embodiment to which this refers, the first interior and exterior pipes 32, 34 are spaced from one another. They may be held spaced from another by at least one spacer.

In parallel with this, the second pipe 30 has a second axis A30 and second interior and exterior pipes 36, 38 coaxial with the second axis A30. The second interior and exterior pipes 36, 38 need not be coaxial with one another. Regardless of the embodiment to which this refers, the second interior and exterior pipes 36, 38 are spaced from one another. They may be held spaced from another by at least one spacer.

The connection device 26 includes an interior connection system 40 configured to connect the first and second interior pipes 32, 36 and an exterior connection system 42 configured to connect the first and second exterior pipes 34, 38. In accordance with one particular feature the interior and exterior connection systems 40, 42 are distinct and spaced from one another.

In accordance with an embodiment that can be seen in FIGS. 3 and 4 the first and second interior pipes 32, 36 respectively has first and second end surfaces 32.1, 36.1 situated in transverse planes (planes perpendicular to the first and second axes A28, A30). In accordance with one arrangement, the first and second end surfaces 32.1, 36.1 are spaced by a short distance, for example a distance less than 10 mm.

Additionally, the interior connection system 40 includes a sleeve 44 that includes a first part 44.1 positioned around an end section T32 of the first interior pipe 32 and a second part 44.2 positioned around an end section T36 of the second interior pipe 36. In accordance with one configuration, the interior connection system 40 is demountable. For example, the first and second parts 44.1, 44.2 of the interior connection system 40 are respectively screwed to the end sections T32, T36 of the first and second interior pipes 32, 36.

In accordance with one configuration, the interior connection system 40 is configured so that when hydrogen at a cryogenic temperature circulates in the first and second interior pipes 32, 36, at least one of the first and second parts 44.1, 44.2 of the sleeve 44 exerts a contact force on the end section T32, T36 of the corresponding first or second interior pipe 32, 36 higher than in the absence of hydrogen during connection of the first and second pipes 28, 30. In accordance with one configuration, the sleeve 44 is made of a first material different from those of the first and second interior pipes 32, 36, this first material having a coefficient of expansion higher than those of the first and second interior pipes 32, 36.

Of course, the invention is not limited to this embodiment of the interior connection system 40.

As illustrated in FIGS. 3 and 4, the first and second exterior pipes 34, 38 respectively have first and second end surfaces 34.1, 38.1 situated in transverse planes (planes perpendicular to the first and second axes A28, A30).

In accordance with a preferred first arrangement that can be seen in FIG. 3, the first and second end surfaces 34.1, 38.1 are spaced by a sufficient distance to allow access to the interior connection system 40.

Of course, the invention is not limited to this arrangement. Thus, in accordance with a second arrangement illustrated in FIG. 4, the first and second end sections 34.1, 38.1 could be closely spaced, or even in contact with one another. In accordance with this second arrangement, the sleeve 44 of the interior connection system 40 is connected to one of the first and second interior pipes 32, 36 before the first and second pipes 28, 30 are moved closer together and automatically engages around the other first or second interior pipe 32, 36 when the first and second pipes 28, 30 are moved closer together.

In accordance with a first embodiment that can be seen in FIG. 3, the exterior connection system 42 includes a sleeve 46 that has a first part 46.1 positioned around a first end section T34 of the first exterior pipe 34, a second part 46.2 positioned around a second end section T38 of the second exterior pipe 38 and an intermediate part 46.3 situated between the first and second parts 46.1, 46.2.

In accordance with one configuration, the exterior connection system 42 is demountable.

In accordance with a first embodiment, the first and second end sections T34, T38 each have a male thread and an outside diameter greater than the outside diameters of the first and second exterior pipes 34, 38 apart from in the first and second threaded end sections T34, T38. In a complementary way, the first and second parts 46.1, 46.2 of the sleeve 46 each have a female thread matching the male thread of the first or second end section T34, T38 of the corresponding first or second exterior pipe 34, 38. The intermediate part 46.3 of the sleeve 46 has an inside diameter greater than the greatest outside diameter of the first or second exterior pipe 34, 38 to enable the sleeve 46 to slide relative to the first or second exterior pipe 34, 38 during connection of the first and second pipes 28, 30.

To strengthen the seal between the sleeve 46 and the exterior pipes 34, 36 in the event of hydrogen leaking, the sleeve 46 is made from a first material different from those of the first and second exterior pipes 34, 38, this first material having a coefficient of expansion greater than those of the first and second exterior pipes 34, 38. Thus, in the event of hydrogen leaking at the level of the internal connection system 40, the sleeve 46 and the first and second exterior pipes 34, 38 will be subjected to a temperature much lower than that in the absence of leaks, causing them to contract. Given that the sleeve 46 has a higher coefficient of expansion, it will contract more than the first and second exterior pipes 34, 38, which will increase the pressure clamping the sleeve 46 onto the first and second exterior pipes 34, 38. For example, the sleeve 46 is made of aluminum alloy and the first and second exterior pipes 34, 38 are made of steel.

Of course, the invention is not limited to this embodiment of the exterior connection system 42.

In accordance with the second embodiment that can be seen in FIG. 4 the exterior connection system 42 includes:
  a first flange 48 secured to the first exterior pipe 34, projecting relative to the latter, having a first lateral face oriented in use toward the second exterior pipe 38 and positioned in a plane perpendicular to the first axis A28 and a second lateral face opposite the first front face and at an angle to the latter that widens in the direction of the first axis A28;
  a second flange 50 secured to the second exterior pipe 38, projecting relative to the latter, having a first lateral face oriented in use toward the first exterior pipe 34 and positioned in a plane perpendicular to the second axis A30 and a second lateral face opposite the first front face and at an angle to the latter that widens in the direction of the second axis A30;
  a clamping collar 52 with a U or V section, for example, having two wings configured to be pressed against the second lateral faces of the first and second flanges 48, 50.

As in the first embodiment, the clamping collar 52 is made of a first material different from those of the first and second exterior pipes 34, 38, this first material having a coefficient of expansion higher than those of the first and second exterior pipes 34, 38. Accordingly, in the event of hydrogen leaking, the clamping force of the clamping collar 52 will be greater than in the absence of leaks.

Regardless of the embodiment to which this refers, the exterior connection system 42 includes a first part that cooperates with a first end section T34 of the first exterior pipe 34, surrounding it, for example, a second part that cooperates with a second end section T38 of the second exterior pipe 38, surrounding it, for example, the exterior connection system 42 being configured so that at a first temperature, in the presence of a hydrogen leak, at least one of the first and second parts exerts a contact force on the first or second end section T34, T38 of the corresponding first or second exterior pipe 34, 38 greater than at a second temperature higher than the first temperature in the absence of a hydrogen leak. In accordance with one configuration, the exterior connection system 42 is made of a first material different from those of the first and second exterior pipes 34, 38, this first material having a coefficient of expansion higher than those of the first and second exterior pipes 34, 38.

In accordance with one configuration, the connection device 26 includes at least one sacrificial material 37 inserted between the exterior connection system 42 and the end section T34, T38 of the first and/or second exterior pipes 34, 38. In accordance with one embodiment, the male thread of at least one end section T34, T38 of the first and second exterior pipes 34, 38 is made of a sacrificial material such as indium, for example. Thus, in the event of hydrogen leaking, the exterior connection system 42 exerts a concentric force on at least one end section of the first and second exterior pipes 34, 38, causing deformation of the sacrificial material. This deformation makes it possible to limit the risks of leaking between the exterior connection system 42 and the end section of the corresponding first or second exterior pipes 34, 38.

In accordance with one arrangement, the connection device 26 includes an annular space 54 around the interior connection system 40 and around at least a portion of each of the first and second interior pipes 32, 36 situated on either side of the interior connection system 40. In accordance with one configuration, the connection device includes at least one thermal insulation element 56 positioned in the annular space 54 and filling it at least partly. For instance, the insulation element 56 occupies at least 75% of the annular space 54. In accordance with one arrangement, the insulation element 56 does not fill the annular space 54 completely. Thus, the annular space 54 includes a remaining volume subjected to a vacuum of the order of 0.1 to 0.01% atmosphere, for example.

Variants of the insulation member 56 may include multilayer insulation (MLI), foam or at least one mattress filled with microballs 59.

Figure 5:
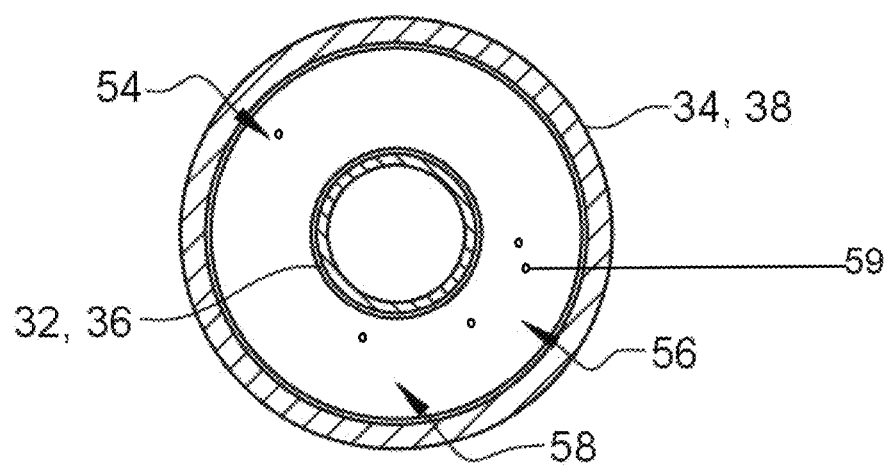
FIG. 5 is a cross-section of the connection device that can be seen in FIG. 3.
Figure 6:
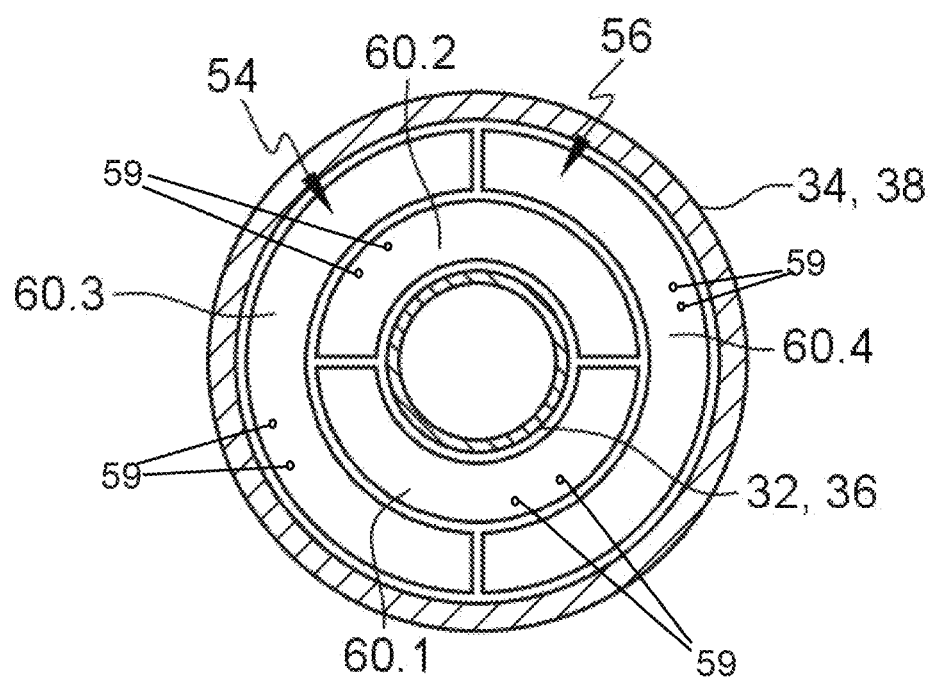
FIG. 6 is a cross-section of a connection device illustrating another embodiment of the invention.

In accordance with a first embodiment that can be seen in FIG. 5, the insulation element 56 includes a mattress 58 of annular shape filled with microballs 59.

In accordance with another embodiment, the insulation element 56 includes mattress layers 60.1 to 60.4 filled with microballs 59, each mattress having a semi-cylindrical shape, the interstices between the mattresses 60.1, 60.2 of a first layer being offset relative to the interstices between the mattresses 60.3, 60.4 of a second layer adjacent to the first layer.

Regardless of the embodiment to which this refers, each mattress filled with microballs 59 guarantees residual thermal insulation in the event of loss of vacuum around the mattress between the interior and exterior pipes.

Of course, the invention is not limited to these embodiments of the intended thermal insulation between the interior and exterior pipes.

Likewise, the invention is not limited to a hydrogen line. Thus, a connection device may be used to connect a first pipe of a line and a second pipe of a hydrogen source or of an apparatus using hydrogen.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for connection of a first pipe and a second pipe, both being double-wall pipes, the first pipe including a first interior pipe that has an end section and an end surface and a first exterior pipe spaced from the first interior pipe that has an end section and an end surface, the second pipe including a second interior pipe that has an end section and an end surface and a second exterior pipe spaced from the second interior pipe that has an end section and an end surface, the connection device comprising: an interior connection system for connecting the first and second interior pipes, and an exterior connection system for connecting the first and second exterior pipes, including a first part that cooperates with the end section of the first exterior pipe and a second part that cooperates with the end section of the second exterior pipe, the exterior connection system being made of a first material different from those of the first and second exterior pipes, the first material having a coefficient of expansion greater than those of the first and second exterior pipes, wherein the exterior connection system is configured so that at a first temperature at least one of the first and second parts exerts a contact force on the end section of the corresponding first or second exterior pipe greater than at a second temperature higher than the first temperature, wherein the connection device includes an annular space around the interior connection system and around at least a portion of each of the first and second interior pipes situated on either side of the interior connection system and at least one thermal insulation element positioned in the annular space and at least partly filling the annular space, wherein the insulation element occupies at least 75% of the annular space, the annular space having a remaining volume subjected to a vacuum, wherein the insulation element includes at least one mattress filled with microballs.

2. The connection device as claimed in claim 1, wherein the end surfaces of the first and second exterior pipes are spaced by a distance allowing access to the interior connection system and wherein the exterior connection system includes a sleeve that has a first part positioned around the end section of the first exterior pipe, a second part positioned around the end section of the second exterior pipe and an intermediate part situated between the first and second parts.

3. The connection device as claimed in claim 2, wherein the end sections of the first and second exterior pipes each have a male thread and an outside diameter greater than the outside diameters of the first and second exterior pipes apart from in the male threaded end sections, and wherein the first and second parts of the sleeve each have a female thread matching the male thread of the end section of the corresponding first or second exterior pipe, an intermediate part of the sleeve having an inside diameter greater than the greatest outside diameter of the first or second exterior pipe to allow the sleeve to slide relative to said first or second exterior pipe.

4. The connection device as claimed in claim 3, wherein the male thread of at least one end section of the first and second exterior pipes is made of a sacrificial material.

5. The connection device as claimed in claim 4, wherein the sleeve is made of a first material different from those of the first and second interior pipes, the first material having a coefficient of expansion greater than those of the first and second interior pipes.

6. The connection device as claimed in claim 1, wherein the connection device includes at least one sacrificial material inserted between the exterior connection system and the end section of the corresponding first or second exterior pipe.

7. The connection device as claimed in claim 1, wherein the interior connection system includes a sleeve that has a first part positioned around the end section of the first interior pipe and a second part positioned around the end section of the second interior pipe.

8. The connection device as claimed in claim 1, wherein the insulation element includes layers of mattresses filled with microballs, each mattress having a semi-cylindrical shape, interstices between the mattresses of a first layer being offset relative to interstices between the mattresses of a second layer adjacent to the first layer.

9. A hydrogen line including at least one connection device as claimed in claim 1.

10. A device for connection of a first pipe and a second pipe, both being double-wall pipes, the first pipe including a first interior pipe that has an end section and an end surface and a first exterior pipe spaced from the first interior pipe that has an end section and an end surface, the second pipe including a second interior pipe that has an end section and an end surface and a second exterior pipe spaced from the second interior pipe that has an end section and an end surface, the connection device comprising:

- an interior connection system for connecting the first and second interior pipes, and
- an exterior connection system for connecting the first and second exterior pipes, including a first part that cooperates with the end section of the first exterior pipe and a second part that cooperates with the end section of the second exterior pipe, the exterior connection system including a sleeve that has a first part positioned around the end section of the first exterior pipe, a second part positioned around the end section of the second exterior pipe and an intermediate part situated between the first and second parts,
- wherein the exterior connection system is configured so that at a first temperature at least one of the first and second parts exerts a contact force on the end section of the corresponding first or second exterior pipe greater than at a second temperature higher than the first temperature,
- wherein the end sections of the first and second exterior pipes each have a male thread and an outside diameter greater than the outside diameters of the first and second exterior pipes apart from in the male threaded end sections,
- wherein the first and second parts of the sleeve each have a female thread matching the male thread of the end section of the corresponding first or second exterior pipe, an intermediate part of the sleeve having an inside diameter greater than the greatest outside diameter of the first or second exterior pipe to allow the sleeve to slide relative to said first or second exterior pipe, and
- wherein the connection device includes at least one sacrificial material inserted between the male thread of the exterior connection system and female thread of the end section of the corresponding first or second exterior pipe.

11. The connection device as claimed in claim 10, wherein the sacrificial material is indium.

\* \* \* \* \*